US00RE45533E

(19) United States
(12) Reissued Patent
Cohen

(10) Patent Number: US RE45,533 E
(45) Date of Reissued Patent: Jun. 2, 2015

(54) CLOTHING HANGER

(75) Inventor: Samuel V. Cohen, Brooklyn, NY (US)

(73) Assignee: Wiesner Products Inc., New York, NY (US)

(21) Appl. No.: 29/427,344

(22) Filed: Jul. 17, 2012

Related U.S. Patent Documents

Reissue of:
(64) Patent No.: Des. 640,876
Issued: Jul. 5, 2011
Appl. No.: 29/380,462
Filed: Dec. 6, 2010

(51) LOC (10) Cl. ..... 06-08
(52) U.S. Cl.
USPC ..... D6/319
(58) Field of Classification Search
USPC ..... D6/316, 317, 318, 319; 211/13.1, 85.3, 211/86.01, 181.1, 183; 223/85, 86, 87, 88, 223/89, 90, 91, 92, 93, 94, 95, 96, 97, 98, 223/99
See application file for complete search history.

(56) References Cited

U.S. PATENT DOCUMENTS

| | | | | | |
|---|---|---|---|---|---|
| 3,733,016 | A | * | 5/1973 | Rood | 223/86 |
| D269,238 | S | * | 6/1983 | Bisk et al. | D6/317 |
| D318,573 | S | * | 7/1991 | Abdi | D6/317 |
| D365,447 | S | * | 12/1995 | North | D6/317 |
| D408,156 | S | * | 4/1999 | Eiley et al. | D6/317 |
| D419,310 | S | * | 1/2000 | Abdi | D6/317 |
| 6,085,950 | A | * | 7/2000 | Gouldson et al. | 223/85 |
| D498,933 | S | * | 11/2004 | Abdi | D6/317 |
| D499,560 | S | * | 12/2004 | Abdi et al. | D6/319 |
| D501,093 | S | * | 1/2005 | Barre et al. | D6/319 |
| D502,006 | S | * | 2/2005 | Abdi | D6/317 |
| D507,705 | S | * | 7/2005 | Abdi et al. | D6/319 |
| D568,620 | S | * | 5/2008 | Wong | D6/319 |
| 7,398,902 | B1 | * | 7/2008 | Sutton | 223/85 |
| D597,749 | S | * | 8/2009 | Heroux | D6/319 |
| D624,324 | S | * | 9/2010 | Fort et al. | D6/319 |
| 2005/0139625 | A1 | * | 6/2005 | Gouldson | 223/85 |

* cited by examiner

*Primary Examiner* — Phillip S Hyder
(74) *Attorney, Agent, or Firm* — Andrew S. Langsam; Pryor Cashman LLP

(57) CLAIM

The ornamental design for clothing hanger, as shown and described.

DESCRIPTION

FIG. 1 is a perspective view of a clothing hanger showing my new design;
FIG. 2 is a front elevational view thereof;
FIG. 3 is a rear elevational view thereof;
FIG. 4 is a top plan view thereof;
FIG. 5 is a bottom plan view thereof;
FIG. 6 is a left side elevational view thereof; and,
FIG. 7 is a right side *elevational* view thereof.
*The subject matter shown in broken line form depict portions of the clothing hanger in which the design is embodied that are not considered part of the claimed design.*

1 Claim, 5 Drawing Sheets

Matter enclosed in heavy brackets [ ] appears in the original patent but forms no part of this reissue; matter printed in italics indicates the additions made by reissue.

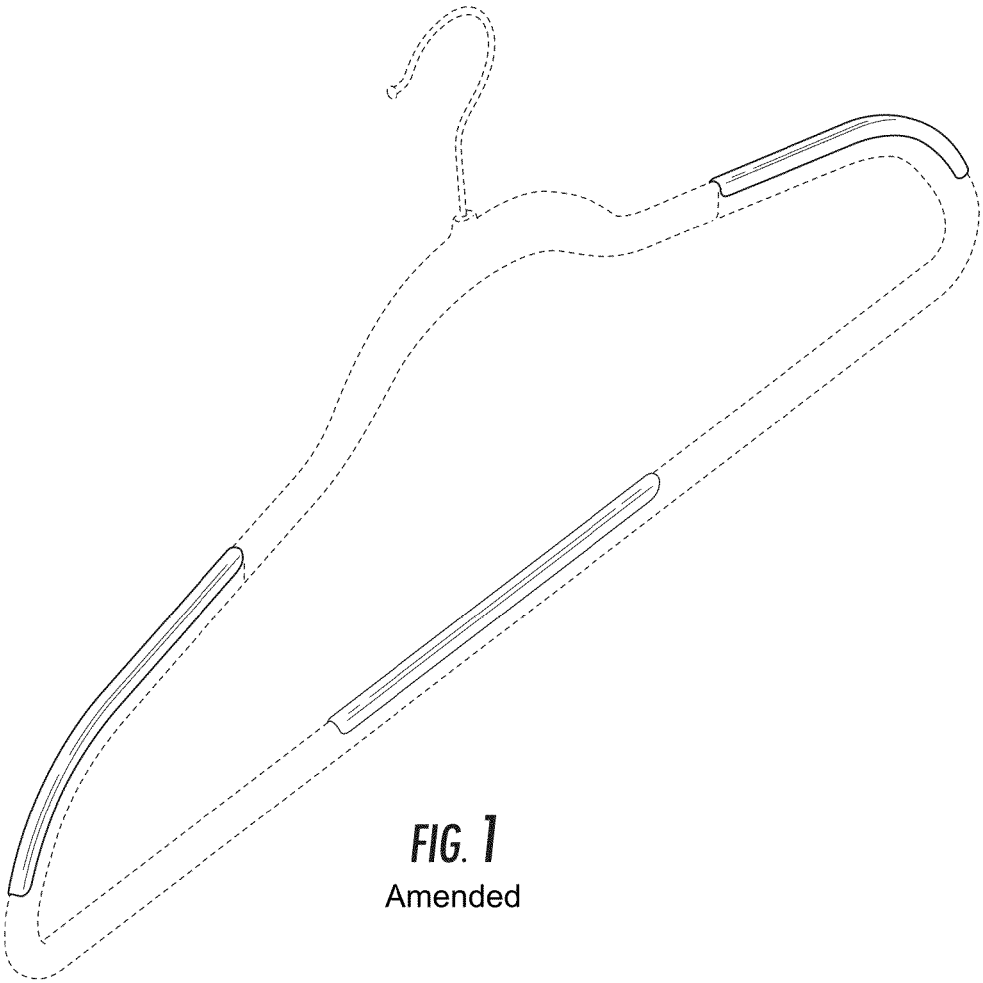
FIG. 1
Amended

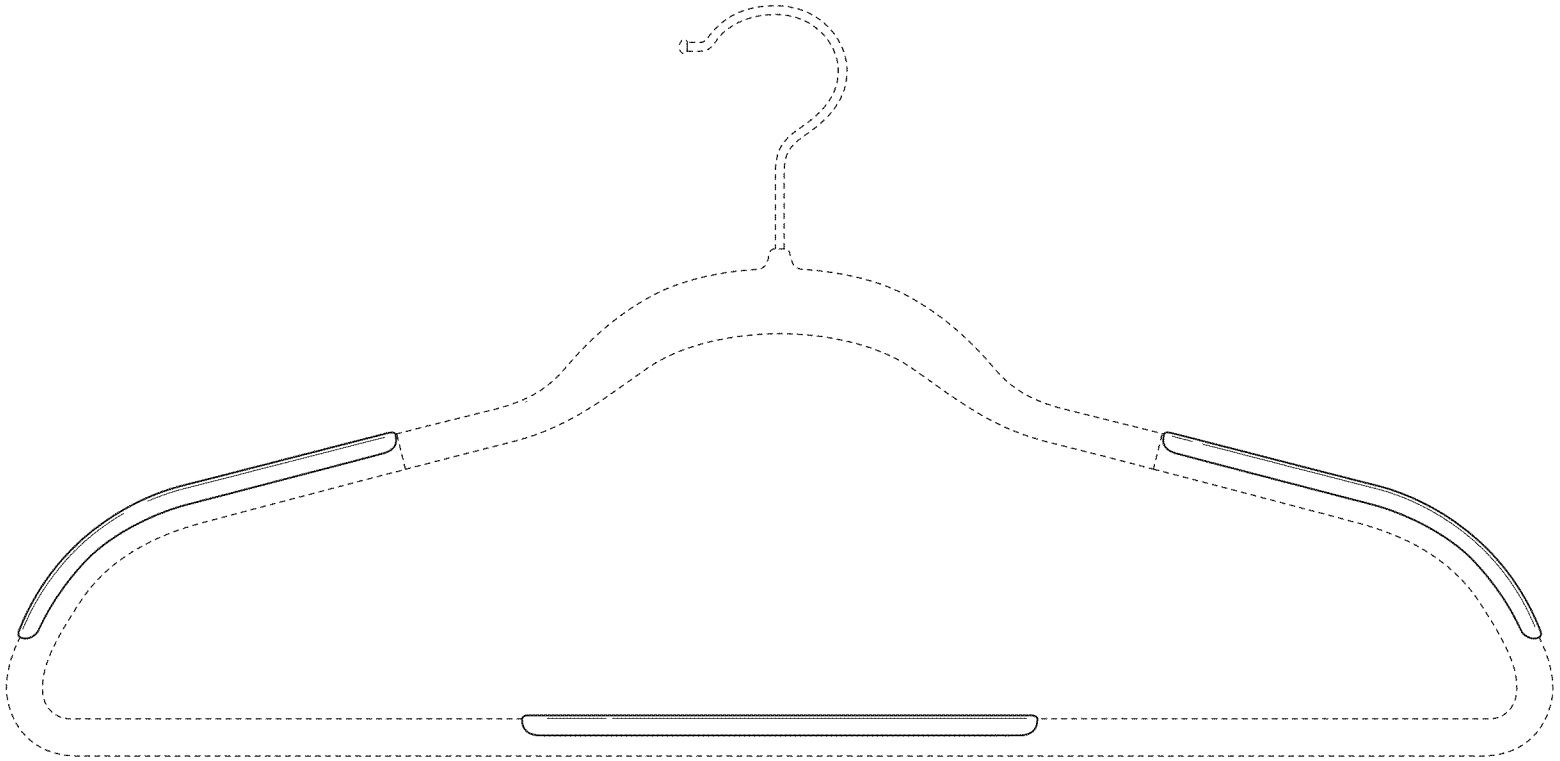
FIG. 2
Amended

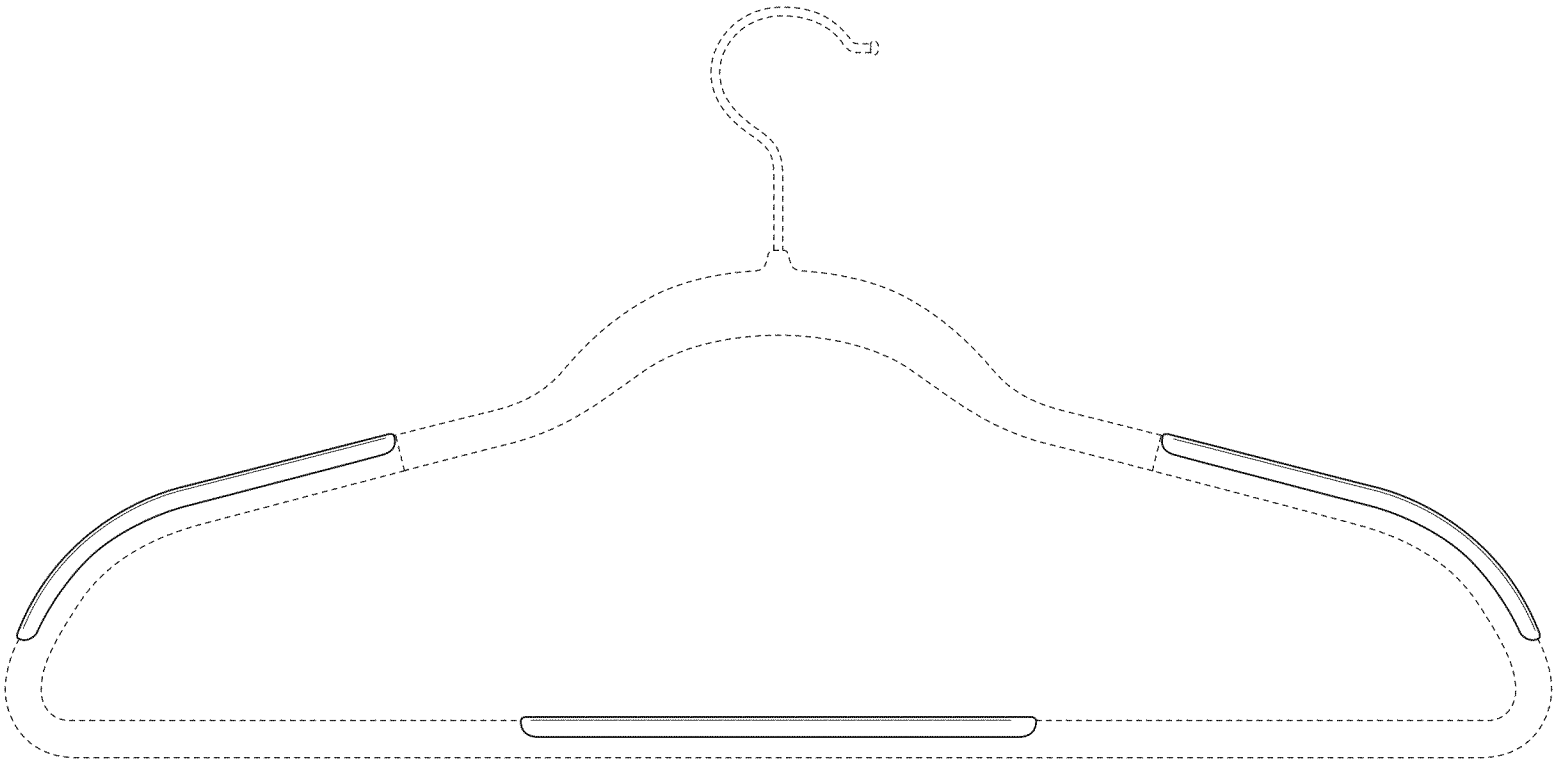
FIG. 3
Amended

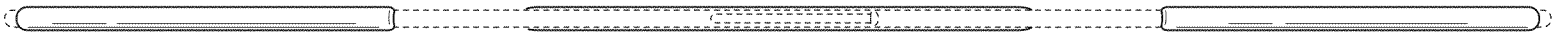
FIG. 4
Amended
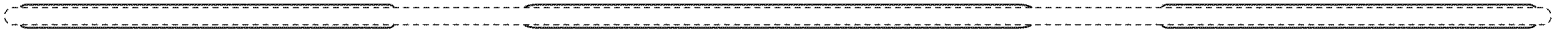
FIG. 5
Amended

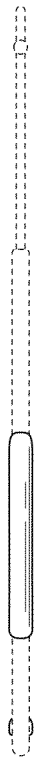
FIG. 6
Amended
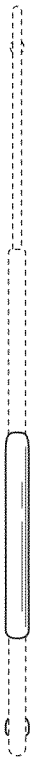
FIG. 7
Amended